United States Patent [19]

Tsurumaki et al.

[11] Patent Number: 5,092,421

[45] Date of Patent: Mar. 3, 1992

[54] FRONT FORK ASSEMBLY FOR MOTORCYCLE

[75] Inventors: Hideo Tsurumaki; Tsuneyoshi Sonoda, both of Hamamatsu, Japan

[73] Assignee: Suzuki Jidosha Kogyo Kabushiki Kaisha, Japan

[21] Appl. No.: 435,691

[22] Filed: Nov. 13, 1989

[51] Int. Cl.$^5$ .................................... B62J 13/00
[52] U.S. Cl. .................... 180/219; 188/24.12; 188/344; 280/276; 280/279; 280/304.3
[58] Field of Search .............. 280/288, 288.4, 152.1, 280/152.2, 281.1, 279, 264, 304.3, 275, 276; 188/24.21, 24.12, 24.19, 24.22, 344; 74/551.1, 551.2, 551.8; 180/219, 84; 296/198

[56] References Cited

U.S. PATENT DOCUMENTS

| | | | |
|---|---|---|---|
| 4,552,373 | 11/1985 | Kawaguchi et al. | 280/276 |
| 4,572,534 | 2/1986 | Heyl | 280/276 |
| 4,878,558 | 11/1989 | Asakura | 280/279 X |

*Primary Examiner*—Mitchell J. Hill
*Attorney, Agent, or Firm*—Bruce L. Adams; Van C. Wilks

[57] ABSTRACT

A front fork assembly of a motorcycle comprises a pair of inverted type front forks each comprising an upper outer tube and a lower inner tube, upper and under brackets mounted to the front fork which are operatively connected to a body of the motorcycle, an axle bracket secured to the lower end of each of the front forks, a caliper bracket secured to the axle bracket, a caliper mounted to the caliper bracket, a disc plate supported by the axle bracket, a protector disposed in front of the front fork for protecting the front fork and a brake hose extending therealong, and a guide member secured to the front fork to vertically slidably support the front fork protector. The lower end portion of the brake hose is protected by a protector of specific structure so as not to contact to the road surface during the running of the motorcycle. The outer tube is prevented from slipping off upwardly by an engaging member specifically formed on the top end of the outer tube and the front wheel is prevented from contacting to a front fender by the specific arrangement of the engaging member. The guide member has a structure for preventing the accidental rotation of the front fork protector.

21 Claims, 9 Drawing Sheets

FRONT FORK ASSEMBLY FOR MOTORCYCLE

BACKGROUND OF THE INVENTION

This invention relates to a motorcycle and, more particularly, to an inverted type front fork structure for a motorcycle having an improved structure for achieving a stable running performance.

An inverted type front fork assembly connected to a steering shaft of a motorcycle through a bracket generally comprises two fork members disposed on bilateral sides of the motorcycle, each front fork comprising an outer tube connected to the steering shaft through a bracket means, generally including an upper bracket and an under bracket, an inner tube shrinkably inserted into the inner hollow portion of the outer tube from the lower side thereof, an axle bracket attached to the lower end of the inner tube, a front axle penetrating the axle bracket in a supported manner to which a front wheel and a disc plate are operatively connected, and a caliper connected to the axle bracket through a caliper bracket.

As stated above, the front fork assembly comprises two fork members each serving as a shock absorbing member, and each front fork half is referred to as a front fork or front fork assembly hereunder throughout the present specification for the sake of convenience.

A flexible brake hose for transmitting hydraulic pressure to the caliper from a brake master cylinder is arranged so as to extend on one side along the longitudinal side of the outer and inner tubes and extend below the lower end of the inner tube. The lower end portion of the brake hose extends along the lower side of the caliper and is connected thereto and, accordingly, there may is a likelihood of the brake hose colliding with a road surface or an obstacle on the road during the running of the motorcycle in spite of the fact that the bent angle of the flexible brake hose is made relatively large at the downward end of the front fork protector. In order to obviate this problem, there is also provided a brake hose arrangement in which the lower end portion of the brake hose further extends from the lower portion of the inner tube upwardly towards the connecting portion of the caliper along the upper configuration thereof for preventing this portion of the brake hose from contacting a road surface during the running of the motorcycle. In this case where the lower end portion of the flexible brake hose extends along the upper configuration of the caliper, contact of the lower end portion of the brake hose with the road surface may be prevented. However, when running direction of the front wheel is changed, running direction, the outer tube is shrunk downwardly relative to the inner tube. The brake hose supported to the outer tube is also lowered. The arrangement of the flexible brake hose is made complicated in a bent manner, for example, in an S-shape, for the reason described above to prevent the same from contacting the road surface when lowered. The bent portion of the flexible brake hose is disposed inside the axle bracket, i.e. on the side of the disc plate, to prevent the bent portion from protruding outwardly.

The downwardly extending portion of the flexible brake hose along the front fork is disposed behind a front fork protector of substantially a flat plate structure arranged in front of the inner tube.

According to the front fork braking mechanism of the character described above, the downward end of the flexible brake hose extending behind and along the front fork protector is bent rearwardly at the lower end portion of the inner tube at severe angles with a small bending radius because the front fork protector has a flat plate-shape. This presents problems such that the entire length of the flexible hose is unnecessarily elongated, resulting in the swelling of the brake hose due to the inner hydraulic pressure when the front wheel is braked and, in addition, the pressure loss of the braking pressure may be accordingly increased.

With the inverted type front fork of the construction described, it is necessary to stably and safely maintain the damper effect in the outer tube due to the sliding motion of the inner tube inside the outer tube, and for this purpose, the clamping force of the under bracket to the lower portion of the outer tube is usually restricted to a force below a predetermined value, whereas the clamping force of the upper bracket to the upper portion of the outer tube is free from the magnitude of the clamping force because the upper portion of the outer tube spaced is apart from the sliding portion of the inner tube inside the outer tube. However, it is troublesome to make different clamping forces for the upper and under brackets during assembly and such complicates the assembly process.

In other words, in a case where the clamping force of the upper bracket is made substantially equal to that of the under bracket, the outer tube may be upwardly displaced when the impact from the road surface is caused during the running of the motorcycle. A normal impact can be absorbed by the damper effect due to the upward displacement of the under bracket, but when a further impact is applied after the under bracket is displaced to its uppermost position, the impact is transferred directly to the outer tube and, accordingly, in a case where the clamping force of the upper bracket to the outer tube is below the predetermined value, the outer tube may be displaced upwardly together with the front wheel. The under bracket is in turn secured to the upper surface of a front fender disposed above the front wheel. In a case where the front wheel is upwardly to a larger extent displaced, the front wheel may contact or abut against the inner surface of the front fender, which may cause a locking condition of the front wheel during the running of the motorcycle. This results in an extremely dangerous condition.

The front fork protector is arranged for the purpose of protecting the inner tube so as to maintain a good damper effect of the inner tube. The front fork protector is secured at the lower end to the lower portion of the inner tube through a bracket and supported at the upper end to the outer tube through a protector guide in the form of a frame to be vertically slidable but restricted in the to-and-fro direction and the bilateral direction thereof. Namely, the protector guide is supported to the outer tube to be relatively vertically movable together with the inner tube with respect to the outer tube.

With the conventional front fork protector including the protector guide of the type described above, the protector guide is rotated in a case where the motorcycle is turned over during the running or contacts another motorcycle or the like. The rotation of the protector guide results in a large the friction loss due to contact with the front fork protector and, in an adverse case, the front fork protector may be damaged or broken. When the motorcycle is assembled, it is necessary to substantially align the center of the front fork protector with the center of the protector guide to minimize the friction loss, but the positioning of the protector guide for this purpose is troublesome and increases the assembly process.

SUMMARY OF THE INVENTION

An object of this invention is to substantially eliminate the defects and drawbacks encountered in the prior art described above and to provide a front fork assembly of a motorcycle having an improved structure capable of achieving a running stability of a motorcycle, a braking stability, and an improved assembly process during the manufacture thereof.

This and other objects can be achieved in one aspect according to this invention by providing a front fork assembly of a motorcycle, comprising:

a pair of front forks;

upper and under brackets mounted on the front forks through which the front forks are connected to a body of a motorcycle;

an axle bracket secured to a lower end of each of the front forks;

a caliper bracket secured to the axle bracket;

a caliper mounted to the caliper bracket;

a brake hose downwardly extending along the front fork in front thereof, the brake hose having a lower end portion downwardly extending below the front fork and then the caliper and having a front end connected to the caliper; and a protector secured to the axle bracket together with the caliper bracket by bolt means so as to cover a side portion of the caliper and protect the lower end portion of the brake hose.

The protector may have a structure adapted to support the lower end portion of the brake hose and to cool the caliper during the running of the motorcycle.

In another aspect according to this invention, there is provided a front fork assembly of a motorcycle, comprising:

a pair of front forks;

upper and under brackets mounted on the front forks through which the front forks are connected to a body of a motorcycle;

an axle bracket secured to a lower end of each of the front forks;

a caliper bracket secured to the axle bracket;

a caliper mounted to the caliper bracket;

a disc plate supported by the axle bracket;

a brake hose downwardly extending along the front fork in front thereof, the brake hose having a lower end portion downwardly extending along a side of the disc plate at a lower end of the front fork and then bent upwardly above the caliper and having a front end connected to the caliper; and a protector disposed in front of the front fork and operatively connected at a lower end to the axle bracket and slidably supported at an upper end by the front fork;

the axle bracket being provided with an engaging projection integrally formed on an outer periphery of the axle bracket on a side facing the disc plate, the engaging projection being arranged so as to support the lower end portion of the brake hose from an underside thereof.

The caliper bracket is integrally formed with the axle bracket.

In a further aspect according to this invention, there is provided a front fork assembly of a motorcycle, comprising:

a pair of inverted type front forks for supporting a front wheel of the motorcycle each comprising an outer tube and an inner tube inserted into the outer tube from the lower side thereof;

upper and under brackets mounted on the front forks through which the front forks are connected to a body of a motorcycle;

an axle bracket secured to a lower end of each of the front forks;

a caliper bracket secured to the axle bracket;

a caliper mounted to the caliper bracket;

a brake hose downwardly extending along the front fork in front thereof, the brake hose having a lower end portion connected to the caliper;

a front fender secured to a lower end of the under bracket; and an engaging means disposed on the outer tube below a lower end of the upper bracket for preventing the outer tube from slipping off upwardly;

the engaging means being disposed apart from the lower end of the upper bracket by a distance equal to or smaller than a displacement of the front wheel defined by a distance between an outer periphery of the front wheel and a lower surface of the front fender against which the outer periphery of the front wheel abuts when the front forks shrink.

The outer tube has an upper end portion composed of a large diametered portion and a small diametered portion to which the upper bracket is secured, and the engaging means is formed at a front end of the large diametered portion and defined by a staged portion formed due to the difference in diameters between the large diametered portion and the small diametered portion of the outer tube.

In a still further aspect according to this invention, there is provided a front fork assembly of a motorcycle, comprising:

a pair of inverted type front forks for supporting a front wheel of the motorcycle each comprising an outer tube and an inner tube inserted into the outer tube from the lower side thereof;

upper and under brackets mounted on the front forks through which the front forks are connected to a body of a motorcycle;

an axle bracket secured to a lower end of each of the front forks;

a caliper bracket secured to the axle bracket;

a caliper mounted to the caliper bracket;

a brake hose downwardly extending along the front fork in front thereof, the brake hose having a lower end portion connected to the caliper;

a protector disposed in front of the front fork for protecting the brake hose, the protector having a lower end supported by the axle bracket;

a guide member mounted to the outer tube for supporting an upper end of the protector to be vertically slidable by limiting displacement in the bilateral position and to-and-fro position thereof; and a member mounted to the outer tube for preventing the guide member from rotating about the outer tube.

The member for preventing the guide member from rotating comprises a cap member mounted to the outer tube and a projection integrally formed on the outer periphery of the cap member and projecting towards the guide member and the guide member comprises a cylindrical portion mounted on the cap member and a frame portion surrounding the front fork protector to be vertically slidable, the frame portion being firmly engaged with the projection of the rotation preventing member.

In prefered embodiments, the front fork assemblies described hereinabove in various aspects may be combined with each other so as to exibit the more improved structures thereof.

According to the front fork assemblies of the characters described above, the brake hose can be protected, so that the brake hose cannot be damaged during the running of the motorcycle. The brake hose is accommodated in a channel-shaped front fork protector and the total length thereof can be reduced, whereby the braking function can be improved.

The outer tube of the front fork can be prevented from being slipped off upwardly by the location of the engaging means which is preferably formed by the upper end of the outer tube, whereby the looking condition of the front wheel can be significantly eliminated, thus maintaining the safe running stability of the motorcycle.

The combination of the various improved structures of the front fork assembly can attain improved running functions and stable operating conditions of the motorcycle.

DESCRIPTION OF THE PREFERRED EMBODIMENTS

Figures 1, 2:
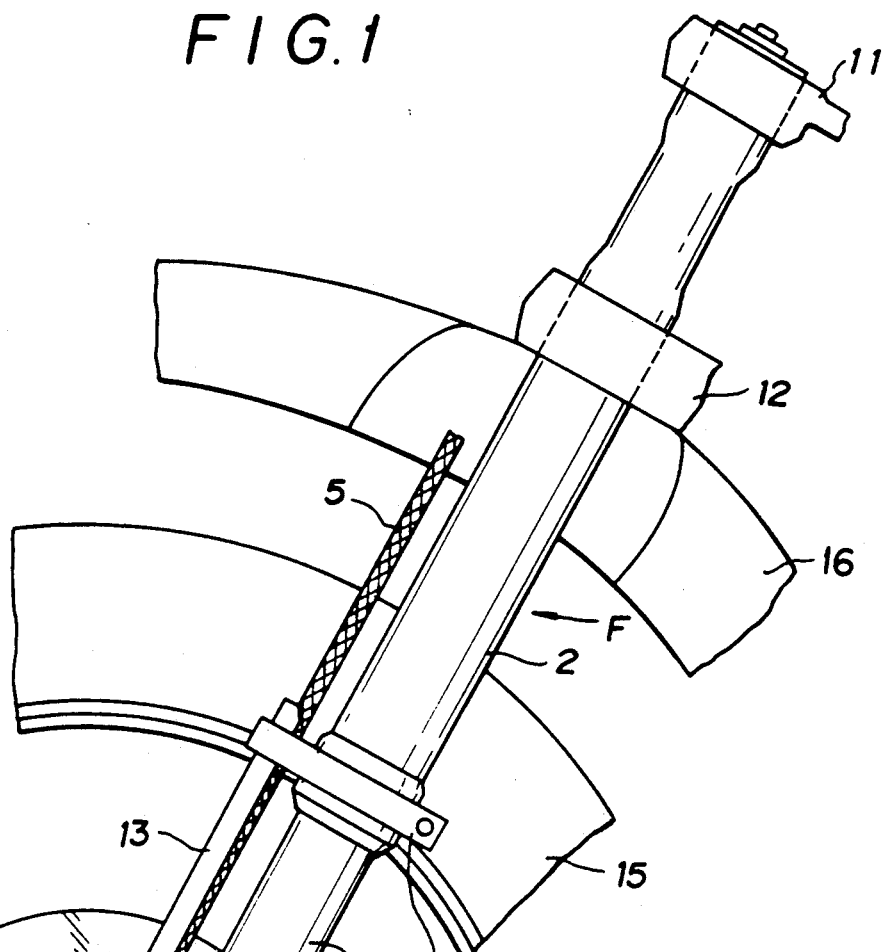
FIG. 1 is a perspective view of the first embodiment of a front fork assembly of a motorcycle according to this invention.
FIG. 2 is a perspective view of a protector for a brake hose of the front fork assembly shown in FIG. 1.

FIGS. 1 and 2 represent the first embodiment according to this invention. FIG. 1 shows an inverted type front fork assembly which generally comprises a front fork half F, called merely front fork hereinafter, composed of an outer tube 2 and an inner tube 1 disposed at the lower portion of the outer tube 2 and slidably inserted into the outer tube 2, and upper and lower brackets 11 and 12 mounted to the outer tube 2 and connected to a steering shaft, not shown, of a main frame of a body of a motorcycle. A brake hose 5 extends downwardly along the front side of the front fork F, and the brake hose 5 is covered by a front fork protector 14 in front of the inner tube 1. The front fork protector 13 is supported at the lower end thereof by an axle bracket 10 and at the upper end thereof by a protector guide 14 to be upwardly slidable. Reference numeral 8 designates a disc plate supported by a front axle 3, numeral 15 is a front wheel supported by the front axle 3 and numeral 16 is a front fender secured to the lower portion of the under bracket 12.

Referring to FIG. 1, a caliper 4 and the lower end portion 5a of the brake hose 5 connected to the caliper 4 are covered by a brake hose protector 9. The brake hose protector 9 is made of an iron plate by bending the same or of a plastic material by molding the same so as to have a shape as shown in FIG. 2 having a lower portion 9c bent in an L-shape. The brake hose protector 9 is provided with a flat portion 9d covering the outer side of the caliper 4 when assembled, the flat portion 9d having a plurality of ventilation holes in the form of slits 9a for ventilation and an upper end portion in which at least one hole 9b (two in the illustration) for inserting a bolt 7 is formed. The brake hose protector 9 of the character described above is attached, together with a caliper bracket 6, to the axle bracket 10 by inserting the bolt 7 into the hole 9b and clamping the same. In the assembling of the brake hose protector 9, the lower end portion of the brake hose 5a is arranged so as to be received by a recessed or channel portion of the L-shaped lower portion 9c of the protector 9.

According to this embodiment, the brake hose protector 9 is located to protect the caliper 4, and the lower end portion of the brake hose 5a which is received in the L-shaped portion of the protector 9. Accordingly, the lower end portion of the brake hose 5 can never contact the road surface regardless of the road condition. The protector 9 is also provided with ventilation holes 9a, so that the cooling of the caliper 4 can be effectively performed. In addition, since the brake hose protector 9 can be attached to the axle bracket 10 together with the caliper bracket 6 by means of the common bolt 7, an additional bolt means, for example, can be eliminated, thus easily attaching the the brake hose protector 9.

Figure 3:
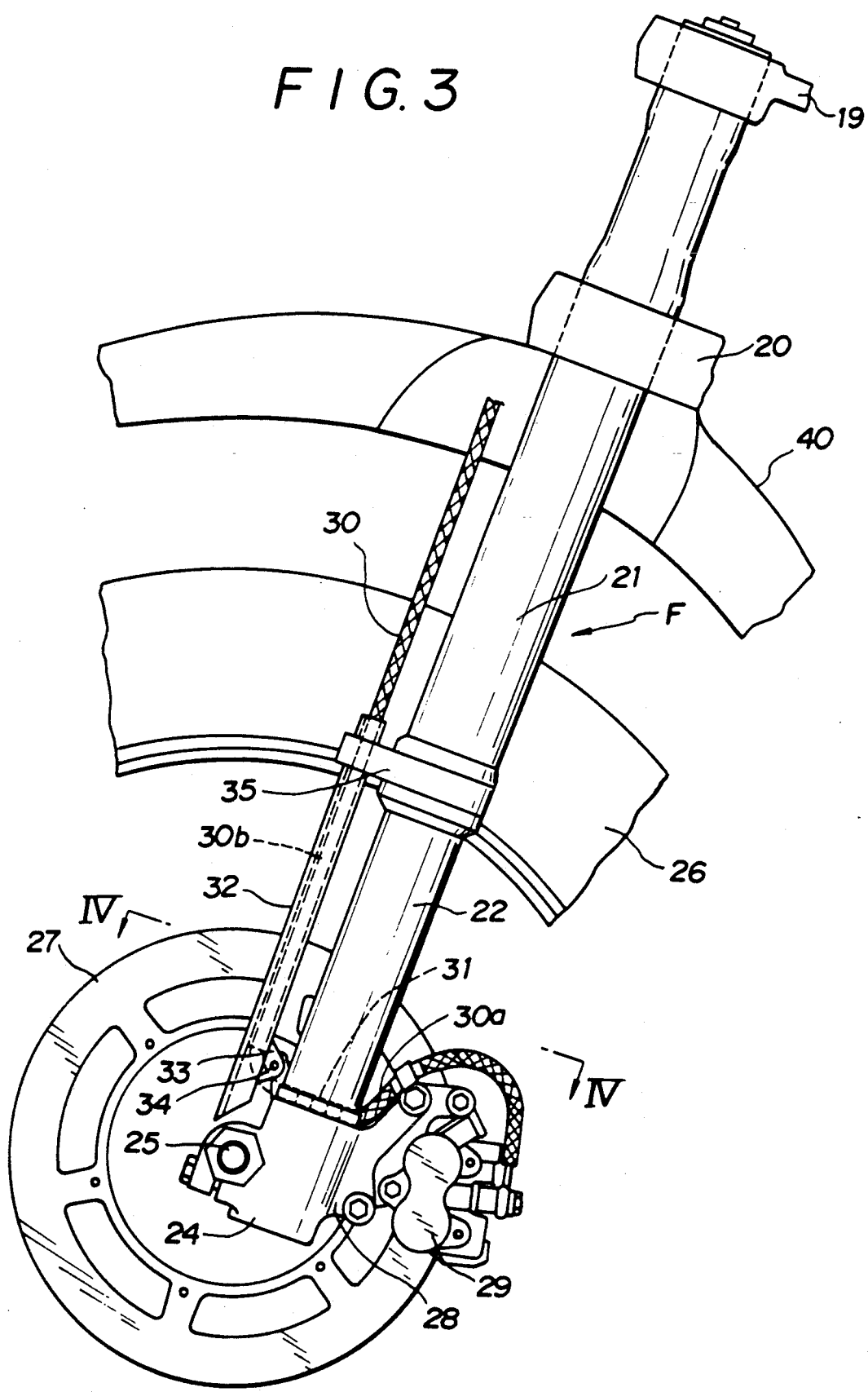
FIG. 3 is a side view of the second embodiment of a front fork assembly according to this invention.
Figure 4:
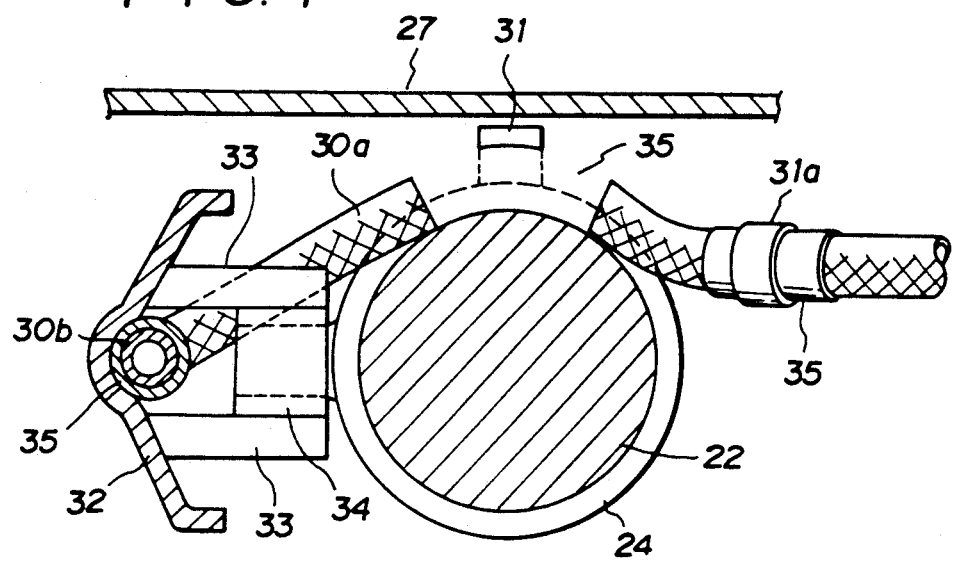
FIG. 4 is an enlarged sectional view taken along the line IV—IV shown in FIG. 3.
Figure 5:
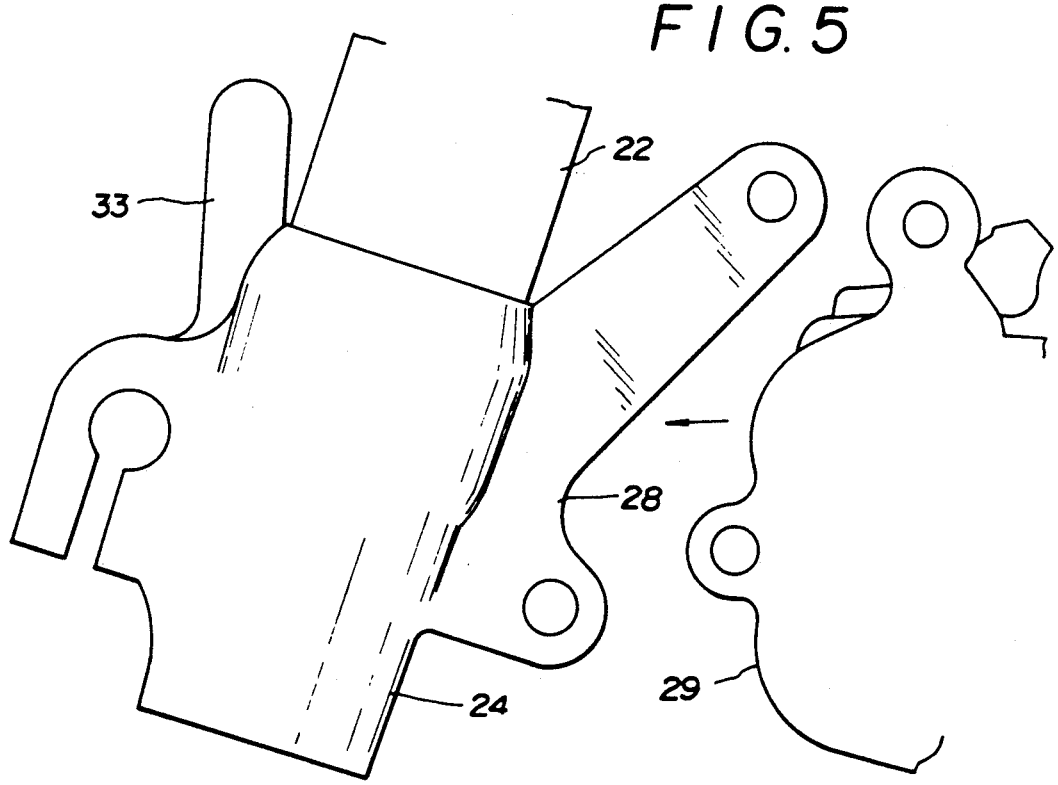
FIG. 5 is an enlarged illustration showing the structure of an axle bracket and a caliper of the front fork assembly shown in FIG. 3.

FIGS. 3 to 5 represent the second embodiment of an inverted type front fork assembly of a motorcycle according to this invention.

FIG. 3 shows an inverted type front fork assembly F comprising an outer tube 21 operatively connected to a body of a motorcycle through an upper bracket 19 and an under bracket 20 and an inner tube 22 slidably inserted into an inner hollow portion of the outer tube 21 from the lower end side thereof. An axle bracket 24 is secured to the lower end of the inner tube 22 and a front axle 25 is mounted to the axle bracket 24 in a penetrating manner. The front axle -25 supports a front wheel 26 and a disc plate 27. The axle bracket 24 is secured to a caliper bracket 28 to which a caliper 29 is mounted. A front fender 40 is connected to the under bracket 20.

A flexible brake hose 30 for transferring a hydraulic braking pressure to the caliper 29 from a master cylinder, not shown, is disposed so as to extend downwardly along the front fork F. The lower end portion 30a of the brake hose 30 is rearwardly bent along an upper portion of the side of the disc plate 27 and upwardly extends above the caliper 29 so that the lower front end of the brake hose 30 is connected to the caliper 29.

Namely, as best illustrated in FIG. 4, a substantially L-shaped engaging piece 31 is integrally formed to the upper portion of the axle bracket 24 on the side of the disc plate 27 so that the engaging piece 31 has an upwardly opened portion into which the brake hose 30 is forcibly inserted. The bent lower portion of the brake hose 30 is press-fitted into the engaging piece 31 from the upper side thereof to thereby support the brake hose 30. The brake hose 30 is also supported by a clamping member 31a to the caliper bracket 28 at a portion downstream of the engaging piece 31.

The front fork F is protected by a front fork protector 32 located in front of the inner tube 22 front fork 23 and the front fork protector 32 is of a channel structure having an opening facing the front fork F. The lower end of the front fork protector 32 is secured to the axle bracket 24 by way of a pair of arms 33 and 33 and a connecting pin 34 and the upper end of the front fork protector 32 is supportd in a vertically slidable fashion by a supporting frame 35 secured to the lower end of the outer tube 21. The brake hose 30 extends downwardly in a recessed portion of the channel-shaped front fork protector 32 and the lower end portion of the brake hose 30 then extends through a space defined between the arms 33 and the connecting pin 34 towards the engaging piece 31.

According to the structure of this embodiment described above, the lower bent or curved portion 30a of the flexible brake hose 30 is supported by the engaging piece 31a located above the axle bracket 24, so that the total length of the brake hose 30 is reduced by a length equivalent to the downwardly slack portion in the conventional arrangement thereof, for example, by about 110 mm.

The arrangement of the rearwardly open-type channeled front fork protector 32 makes it possible to accommodate therein the brake hose 30 and to pass the space between the arms 33 and 33. Accordingly, the brake hose 30 is arranged in front of the front fork F in comparison with the conventional arrangement, so that the lower portion 30a of the brake hose 30 can be bent with a relatively large radius, whereby the expansion of the brake hose 30 at the braking time can be reduced by the reduction of the total length thereof and by the large radius of the bent portion 30a, resulting in the reduction of the pressure loss of the hydraulic braking pressure and improving the braking feeling of the motorcycle.

FIG. 5 is an enlarged view showing the detail of the attachment of the caliper 29 to the axle bracket 24. Referring to FIG. 5, the caliper bracket 28 is integrally formed with the axle bracket 24 so as to project therefrom. In the conventional structure, the caliper bracket 28 and the axle bracket 24 are constructed as independent members, which are then mutually coupled or connected, so that the number of the component parts increases and additional assembling steps are required. The integral structure according to this invention can eliminate these adverse defects and, hence, the manufacturing thereof can be simplified.

Figure 6:
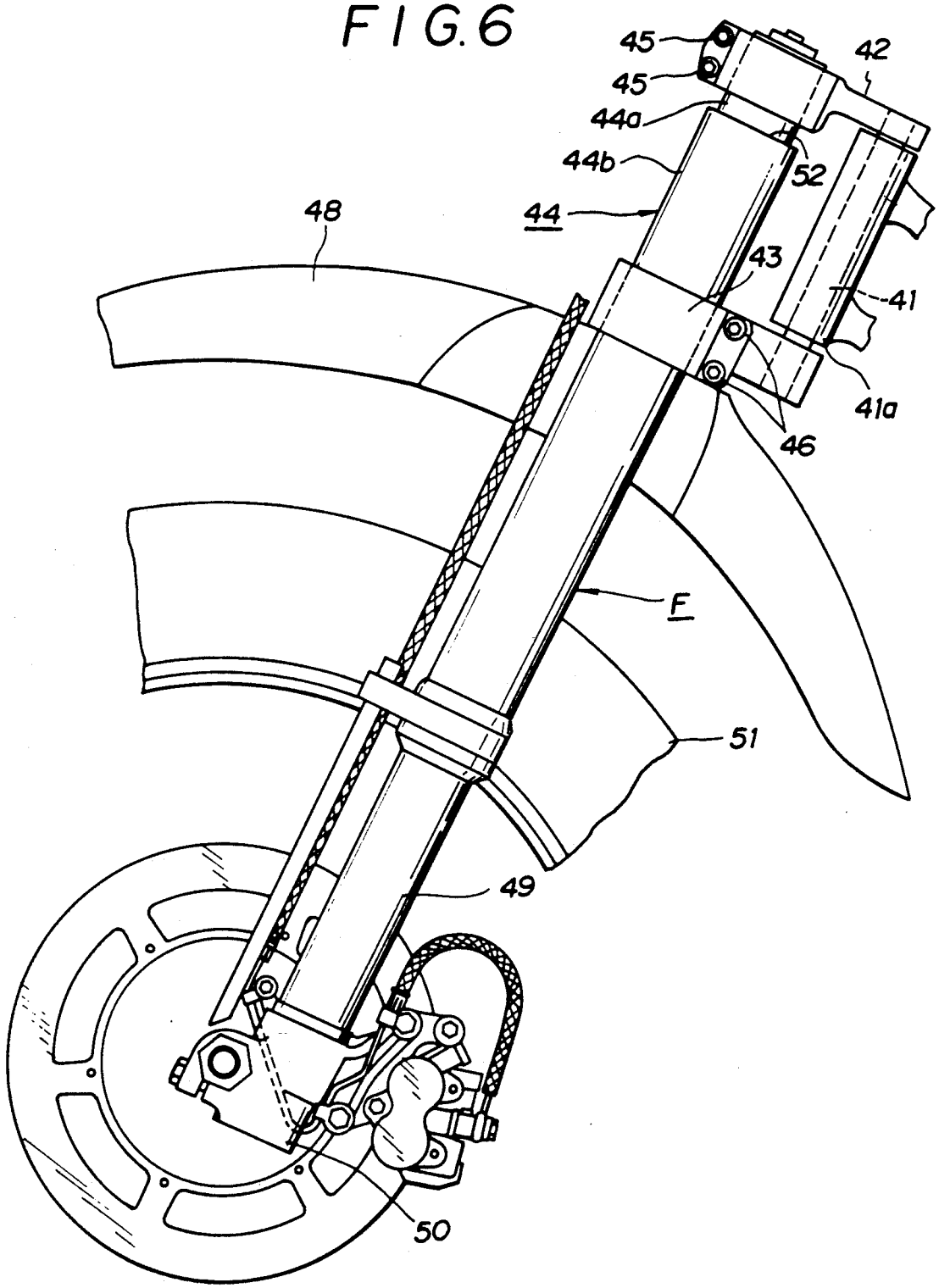
FIG. 6 is a view similar to that of FIG. 3 of the third embodiment according to this invention, in which the front fork is fully extended.

FIG. 6 represents the third embodiment according to this invention relating to the inverted type front fork of a motorcycle of the type similar to that described with reference to the second embodiment. The inverted type front fork of the third embodiment is particularly provided with the improved structures of the upper and under brackets and elements associated therewith.

In detail, referring to FIG. 6, a head pipe 41a is connected to a main frame of a motorcycle, not shown, and a steering shaft 41 is inserted into the head pipe 41a. Upper and lower brackets 42 and 43 are secured to the upper and lower ends of the steering shaft 41 in projecting fashion. A front fork F comprises an outer tube 44 and an inner tube 49 inserted into the outer tube 44 from the lower side thereof so as to constitute an inverted type front fork. The upper end of the outer tube 44 is formed as a smaller diametered portion 44a which is inserted into the upper bracket 42, which is clamped to the outer tube 44 by means of bolts 45 and 45, and a larger diametered portion 44b of the outer tube 44 is inserted into the under bracket 43, which is clamped to the outer tube 44 by means of bolts 46 and 46. A front fender 48 is secured to the lower end of the under bracket 43 by means of bolts 47. The lower end of the inner tube 49 is connected to an axle bracket 50 by which a front wheel 51 is supported.

Figure 7:
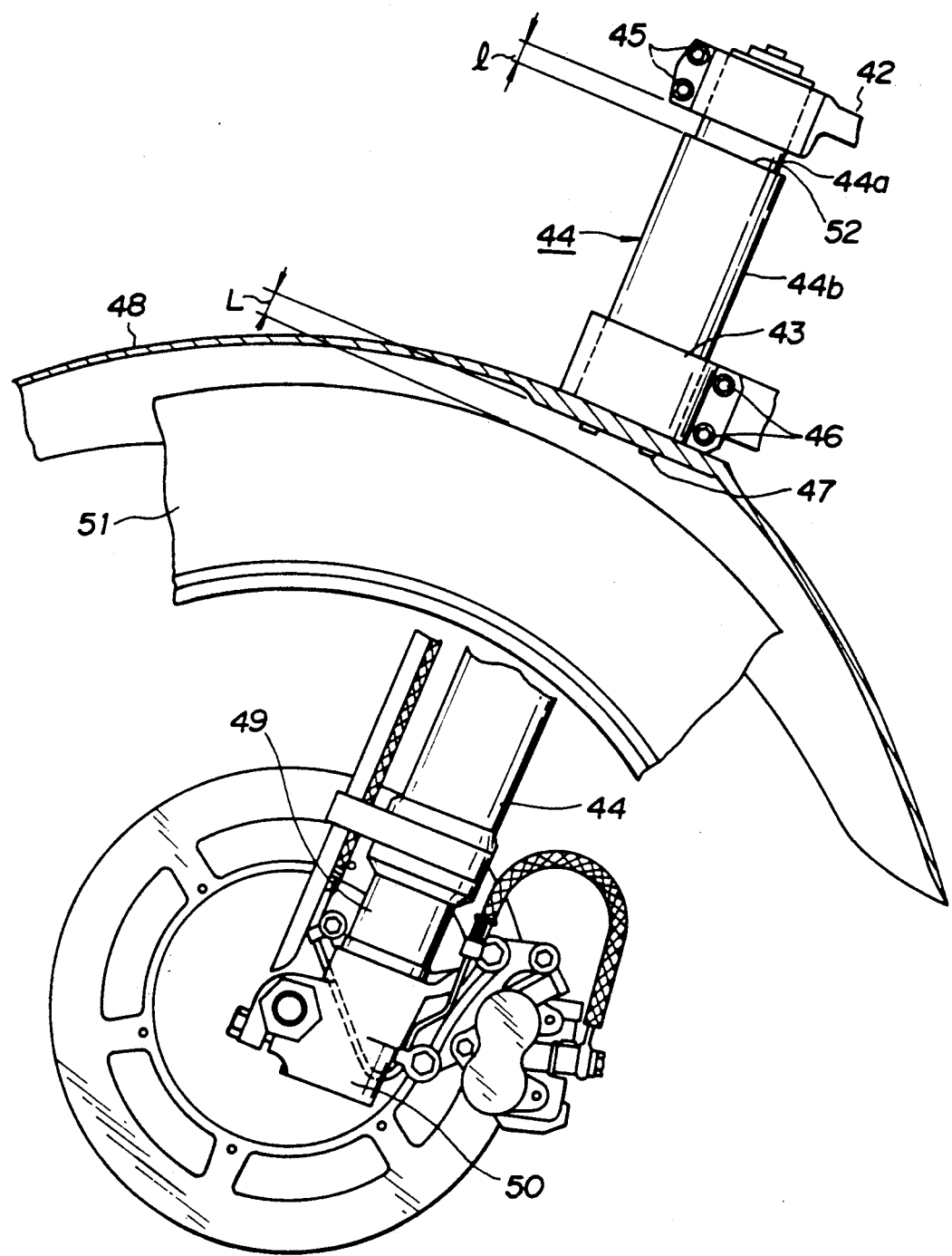
FIG. 7 is a view similar to that shown in FIG. 6, but partially eliminated, in which the front fork is fully retracted.

Referring to FIG. 7, an engaging portion 52 for preventing the outer tube 44 from slipping out upwardly is formed to the outer tube 44 in engagement with the lower end of the upper bracket 42. In this embodiment, the upper end of the large diametered portion 44b of the outer tube 44 is formed as the engaging portion 52, which is formed due to the difference in diameters between the smaller and larger diametered portions 44a and 44b of the outer tube 44. The outer tube 44 can be thus prevented from slipping out upwardly in engagement of the engaging portion 52 with the lower end of the upper bracket 42. The distance between the engaging portion 52, i.e. the upper end of the larger diametered portion 44b, and the lower end of the upper bracket 42 is predetermied to be a value of l when the upper bracket 42 is clamped to the smaller diametered portion 44a of the outer tube 44. The distance l is designed to be in a range of $0 \leq l \leq L$, where the letter L designates a distance between the position in which the front wheel 51 is fully displaced upwardly and the lower surface of the front fender 58 to which the front wheel may abut when the inner tube is slidably retracted.

According to the structure described above, since the front wheel 51 supported by the axle bracket 50 connected to the front fork F can be displaced from the position shown in FIG. 6 in which the inner tube 49 of the front fork F is maximumly downwardly extended to the position as shown in FIG. 7 in which the inner tube 49 is maximumly upwardly displaced, the impact from the road can be effectively absorbed. In a case where an upward impact greater than the clamping force of the upper and under brackets 42 and 43 is applied to the outer tube 44 in the state shown in FIG. 7, the outer tube 44 may be upwardly displaced and slide relative to the upper and under brackets 42 and 43. However, this displacement of the outer tube 44 is limited to the distance l between the engaging portion 52 and the lower end of the upper bracket 42, and the distance l is designed to be smaller than the distance L between the front fender 58 and the front wheel 51, whereby the front wheel 51 is never engaged with the front fender 58 in a locked condition and, accordingly, the safe driving of the motorcycle can be ensured. In addition, for the reason described above, the clamping force of the upper bracket 42 need not be stronger than the clamping force of the under bracket 43 and both the brackets 42 and 43 may be clamped with substantially the same clamping force.

Figure 8:
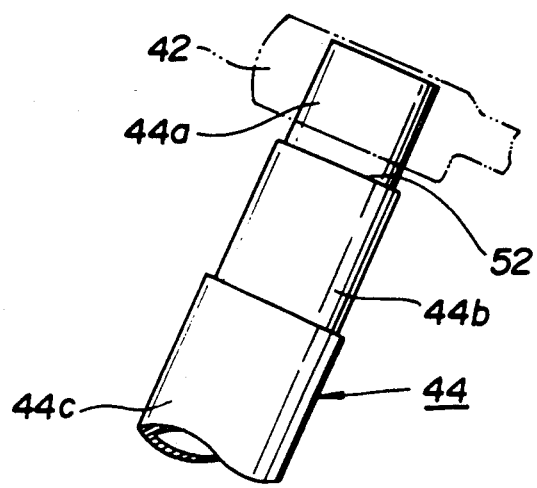
FIGS. 8 and 9 are perspective views of upper portions of the outer tubes of the front fork assembly shown in FIG. 6.
Figure 9:
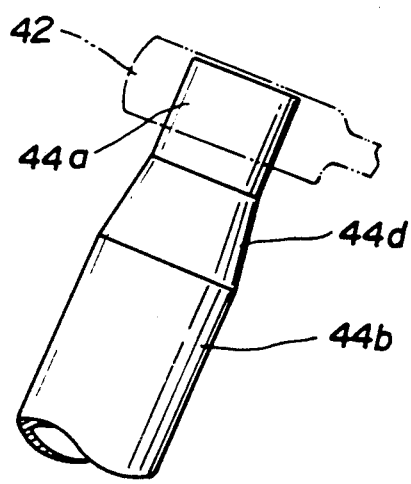

FIGS. 8 and 9 show other examples of the structure of the engaging portion 52 other than the structure shown in FIG. 7. Referring to FIG. 8, the upper end portion of the outer tube 44 is composed of three staged portions 44a and 44b and 44c which have diameters different from each other; smaller, intermediate and larger from the upper end side of the outer tube 44. In this example, the upper end of the intermediate diametered portion 44b acts as the engaging portion 52. Referring to FIG. 9, a portion between the smaller diametered portion 44a and the larger diametered portion 44b of the outer tube 44 is formed as a tapered portion 44d so as to serve as the engaging portion 52.

The distance 1 may be selected to satisfy the relationship $0 \leq 1 \leq L$ and in case of the distance 1 = 0, the outer tube 44 is secured in engagement with the upper bracket 42.

The third embodiment was referred to with respect to the improvement of the structure of the upper and under brackets secured to the outer tube of the front fork, but this embodiment may be combined with the first embodiment or second embodiment regarding the improvement of the arrangement of the brake hose. According to such combined embodiments, more advantageous effects can be achieved.

Figure 10:
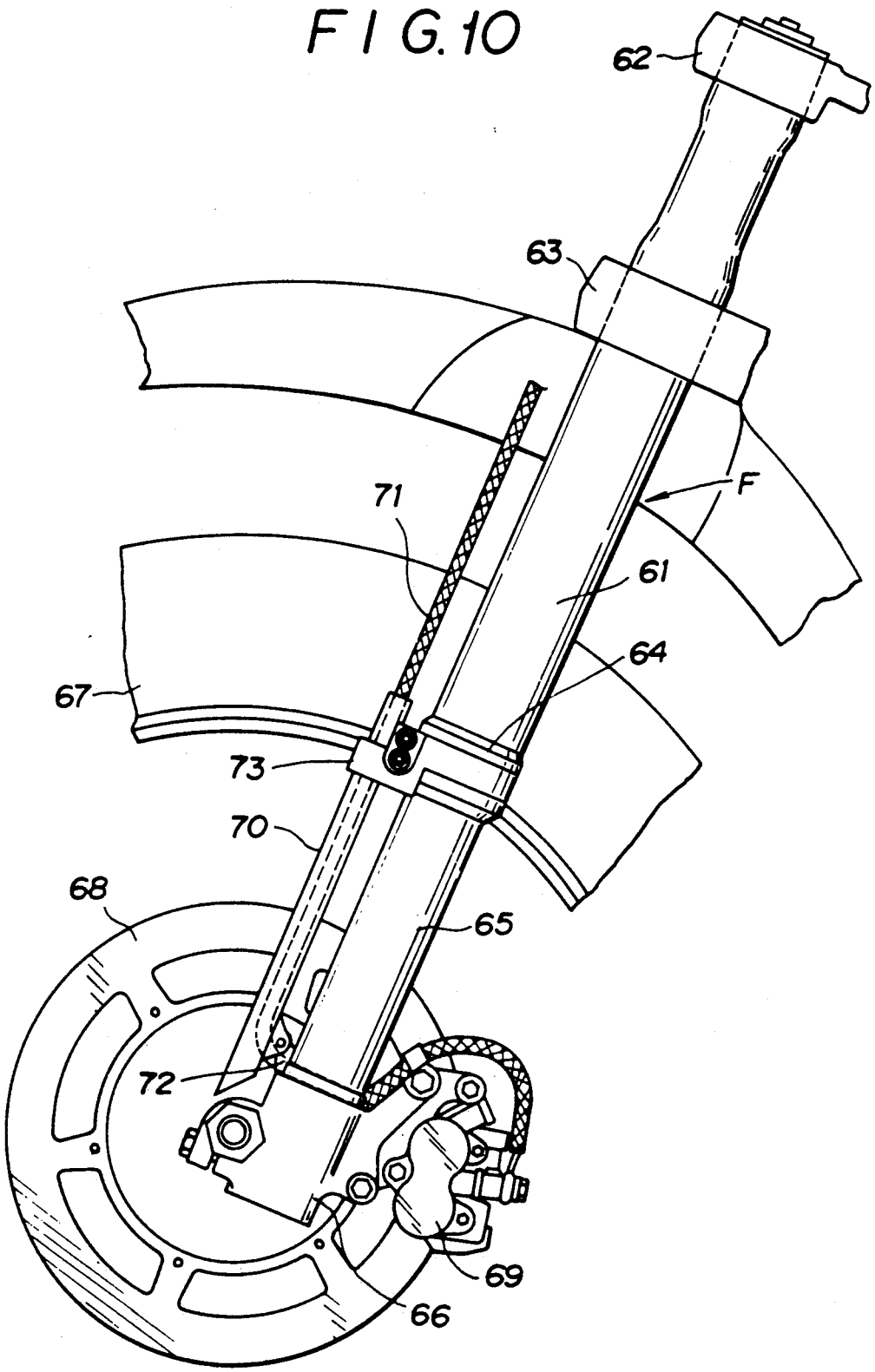
FIG. 10 is a view similar to that of FIG. 3 of the fourth embodiment according to this invention.

FIG. 10 repesents the fourth embodiment of an inverted type front fork assembly according to this invention.

Referring to FIG. 10, the respective elements or members constituting the inverted type front fork assembly generally correspond to those shown in FIG. 3 except the structure of a protector guide generally designated by reference numeral 63 and, accordingly, the detailed disclosure of the corresponding elements or members is eliminated herein.

Figure 11:
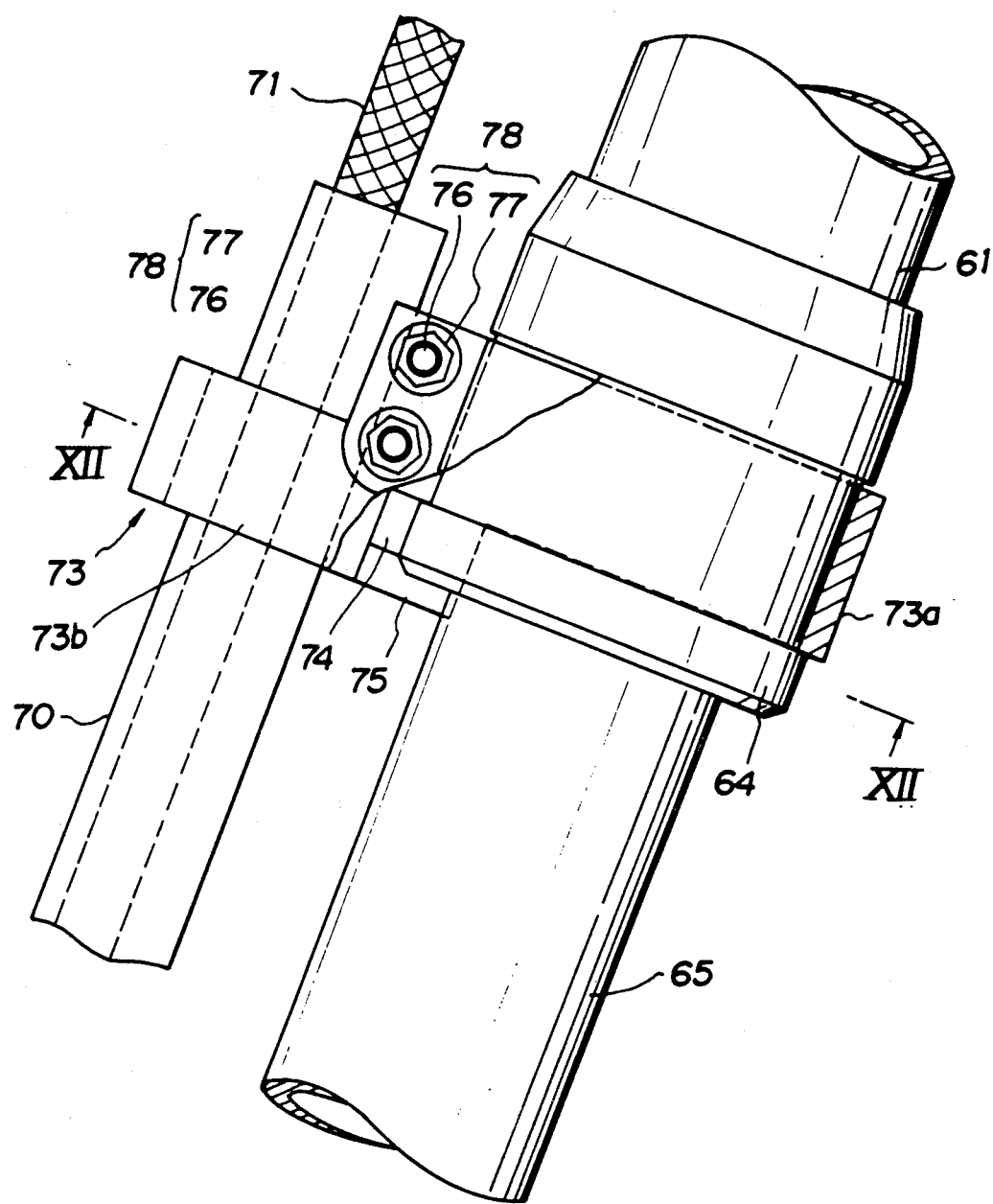
FIG. 11 is an enlarged view of a front fork protector of the front fork assembly shown in FIG. 10.
Figure 12:
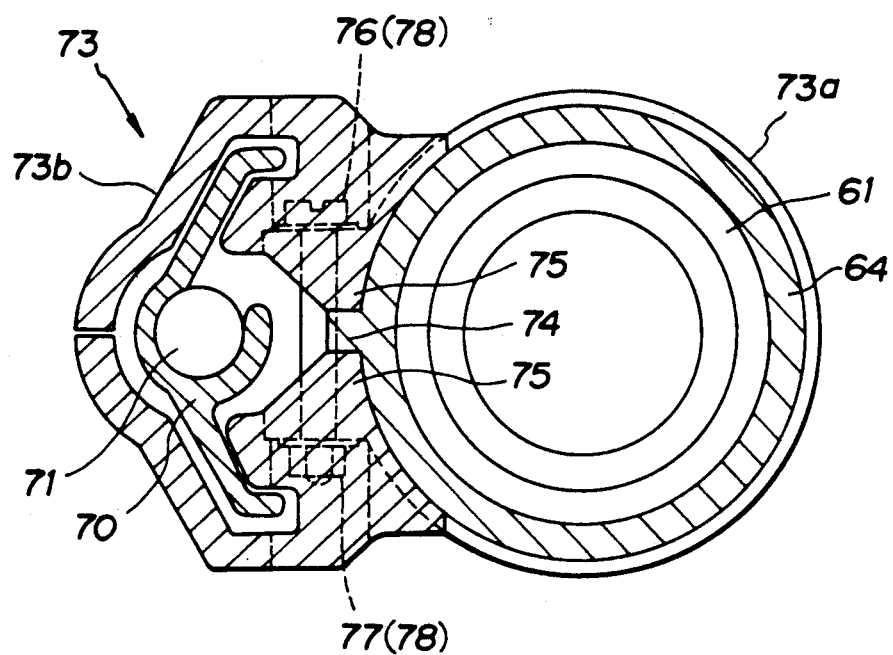
FIG. 12 is a sectional view taken along the line XII—XII shown in FIG. 11.

A front fork protector 70 has a structure substantially the same as that described with reference to the second embodiment, though not necessarily limited to this channel shape, and the channel-shaped front fork protector 70 extends along a front fork F. The lower end of the front fork protector 70 is secured to an axle bracket 66 through a supporting bracket 72. The upper end of the front fork protector 70 is slidably supported by a protector guide 73 secured to a seal cap 64 mounted on the lower end portion of an outer tube 61 of the front fork F. Namely, as shown in FIGS. 11 and 12, the seal cap 64 is screwed to the lower end of the outer tube 61 and a sealing means such as an oil seal is held inside the seal cap 64. A projection 74 is integrally formed on the outer peripheral surface of the seal cap 64 so as to serve as an engaging member having a substantially rectangular cross section for preventing the protector guide 73 from rotating. The seal cap 64 is finally secured to the outer tube 61 of the front fork F so that the projection 74 projects forwardly towards the front fork protector 70.

The protector guide 73 is composed of a cylindrical portion 73a which is mounted to the seal cap 64 and a frame portion 73b which surrounds the fork protector 70, the protector guide 73 thus having a vertically split structure from the central portion of the cylindrical portion 73a towards the front position of the frame portion 73b. The frame portion 73a of the protector guide 73 is provided with a base having a pair of opposing projections 75 and 75 between which the projection 74 of the seal cap 64 is fitted in a clamped manner. A pair of upper and lower clamping members 78 each comprising a bolt 76 and a nut 77 are mounted to the frame portion 73b near the projections 75 and 75 to clamp the projection 74 therebetween.

According to this embodiment of the front fork assembly of the structure described above, a rotation preventing mechanism which is integral with the outer tube 61 can be constituted by the location of the engaging projection 74 of the seal cap 64, whereby the protector guide 73 can be prevented from being rotated about the outer tube 61. Accordingly, even in a case where the motorcycle is accidentally turned over or the motorcycle contacts another vehicle, the protector guide 73 can not be rotated, whereby the friction loss between the frame portion 73b of the protector guide 73 and the fork protector 70 slidably inserted into the inside of the frame portion 73b will not be made large and the fork protector 70 will not be damaged.

When the body of the motorcycle is assembled, the engaging projection 74, as the rotation preventing member, of the seal cap 64 is firmly screwed so as to forwardly project towards the front fork protector, so that the center of the protector guide 73 and the center of the fork protector 70 can easily be aligned merely by positioning the engaging portions 75 and 75 of the protector guide 73 so as to clamp the engaging projection 74 therebetween, thus eliminating a troublesome positioning process and, hence, simplifying the total assembling process.

The fourth embodiment was referred to with respect to the improved structure of the protector guide in connection with the front fork protector, but this embodiment may be combined with the first or second embodiment, for example FIG. 10 representing an embodiment of the combination of the second and fourth embodiments. Moreover, the fourth embodiment may be further combined with the third embodiment. According to such combined embodiments, more advantageous effects will be attained.

These embodiments were described hereinabove with respect to the motorcycle provided with the inverted type front fork assembly, but this invention may be applicable to a motorcycle provided with a non-inverted type front fork in which the outer tube is positioned at the lower side of the inner tube.

What is claimed is:

1. A front fork assembly for a motorcycle comprising: a front fork having a pair of legs each comprised of upper and lower tubular members telescopically mounted one within the other to undergo telescopic extension and retraction; an axle bracket connected to the lower ends of the lower tubular members; a caliper bracket connected to the axle bracket; a fluid-actuated brake caliper mounted on the caliper bracket; a brake hose disposed in front of and extending downwardly along one front fork leg and rearwardly beneath the brake caliper, the brake hose having one end connected to the brake caliper for applying fluid pressure thereto to actuate the brake caliper; and protecting means connected to the axle bracket and having a first portion extending beneath that part of the brake hose which extends rearwardly beneath the brake caliper for protecting said brake hose part.

2. A front fork assembly according to claim 1; wherein the protecting means has a second portion covering a side portion of the brake caliper for protecting said brake caliper side portion.

3. A front fork assembly according to claim 2; wherein the second portion of the protecting means has holes therethrough for providing ventilation for the brake caliper.

4. A front fork assembly according to claim 1; wherein the axle bracket and caliper bracket comprise a unitary structure.

5. A front fork assembly according to claim 1; further including upper and lower brackets clamped to upper portions of the upper tubular members; and engaging means carried by the upper tubular members and engageable with the underside of the upper bracket in the event the upper tubular members are displaced upwardly relative to the upper bracket for limiting the extent of upward displacement thereof.

6. A front fork assembly according to claim 5; wherein the engaging means comprises a stepped portion of the upper tubular members.

7. A front fork assembly according to claim 5; wherein the engaging means comprises a tapered portion of the upper tubular members.

8. A front fork assembly for a motorcycle, comprising: a front fork having a pair of legs each comprised of upper and lower tubular members telescopically mounted one within the other to undergo telescopic extension and retraction; an axle bracket connected to the lower ends of the lower tubular members; a caliper bracket connected to the axle bracket; a fluid-actuated brake caliper mounted on the caliper bracket; a brake hose disposed in front of and extending downwardly along one front fork leg and rearwardly to the brake caliper, the brake hose having one end connected to the brake caliper for applying fluid pressure thereto to actuate the brake caliper; upper and lower brackets clamped to upper portions of the upper tubular members; engaging means carried by the upper tubular members and engageable with the underside of the upper bracket in the event the upper tubular members are displaced upwardly relative to the upper bracket for limiting the extent of upward displacement thereof; and protecting means connected to the axle bracket and having a first portion extending beneath that part of the brake hose which extends rearwardly to the brake caliper for protecting said brake hose part.

9. A front fork assembly according to claim 8; wherein the engaging means comprises a stepped portion of the upper tubular members.

10. A front fork assembly according to claim 8; wherein the engaging means comprises a tapered portion of the upper tubular members.

11. A front fork assembly of a motorcycle, comprising:
a pair of inverted type front forks for supporting a front wheel of a motorcycle, each front fork comprising an outer tube and an inner tube slidably inserted into said outer tube from a lower side thereof;
upper and under brackets mounted on said front forks for connecting said front forks to a body of the motorcycle;
an axle bracket secured to a lower end of each of said front forks;
a caliper bracket secured to said axle bracket;
a caliper mounted to said caliper bracket;
a brake hose downwardly extending along one front fork in front thereof, said brake hose having a lower end portion downwardly extending below said front fork and then said caliper and having a front end connected to said caliper;
a protector means secured to said axle bracket together with said caliper bracket by bolt means so as to cover a side portion of said caliper and protect the lower end portion of said brake hose;
a front fender secured to a lower end of said under bracket;
a protector disposed in front of said front fork for protecting said brake hose, said protector means having a lower end supported by said axle bracket;
a guide means mounted to said outer tube for slidably supporting an upper end of said protector to be vertically slidable by limiting displacement in bilateral position and to-and-fro position thereof;
means mounted to said outer tube for preventing said guide means from rotating about said outer tube, and
engaging means disposed on said outer tube below a lower end of said upper bracket for preventing said outer tube from slipping off upwardly;
said engaging means being disposed in spaced relation from the lower end of said upper bracket by a distance equal to or smaller than a displacement of the front wheel defined by a distance between an outer periphery of the front wheel and a lower surface of said front fender against which the outer periphery of the front wheel abuts when said front forks retract.

12. A front fork assembly of a motorcycle, comprising:
a pair of front forks;
upper and under brackets mounted on said front forks for connecting said front forks to a body of a motorcycle;
an axle bracket secured to a lower end of each of said front forks;
a caliper bracket secured to said axle bracket;
a caliper mounted to said caliper bracket;
a brake hose downwardly extending along one front fork in front thereof, said brake hose having a lower end portion downwardly extending below said front fork and below said caliper and having a front end connected to said caliper; and
a protector means secured to said axle bracket together with said caliper bracket by bolt means so as to cover a side portion of said caliper and protect the lower end portion of said brake hose, said protector means comprising a lower portion formed in a substantially L-shape having a recessed portion into which the lower end of said brake hose is accommodated, a flat portion extending vertically from said lower portion, said flat portion being provided with a plurality of ventilation holes for ventilating said caliper, and an upper portion secured to said axle bracket together with said caliper bracket by bolt means.

13. A front fork assembly according to claim 12, wherein said front fork is of an inverted type comprising an outer tube and an inner tube slidably inserted into said outer tube from a lower side thereof.

14. A front fork assembly of a motorcycle, comprising:
a pair of front forks;
upper and under brackets mounted on said front forks for connecting said front forks to a body of a motorcycle;
an axle bracket secured to a lower end of each of said front forks;
a caliper bracket secured to said axle bracket;
a caliper mounted to said caliper bracket;
a disc plate supported by said axle bracket;
a brake hose downwardly extending along one front fork in front thereof, said brake hose having a lower end portion bent along a side of said disc plate at a lower end of said front fork and then bent upwardly above said caliper and having a front end connected to said caliper; and a protector disposed in front of said front fork and connected at a lower end to said axle bracket and slidably supported at an upper end by said front fork;

said axle bracket being provided with an engaging projection integrally formed on an outer periphery thereof on a side facing said disc plate, said engaging projection being arranged so as to support the lower end portion of said brake hose from an underside thereof, said protector having a channel structure having an opening towards said front fork, and the lower end portion of said brake hose having a portion extending between a lower end of said channel-shaped protector and said engaging projection, said extending portion of the brake hose being supported by a supporting means formed by a pair of arms connected at one of their ends to an inner surface of said channel-shaped protector and a connecting member connecting the other ends of said arms so as to define a space through which said portion of said brake hose extends in a supported manner between said inner surface of the protector, said arms and said connecting member.

15. A front fork assembly according to claim 14, wherein said caliper bracket is integrally formed with said axle bracket.

16. A front fork assembly according to claim 14, wherein said front fork is of an inverted type comprising an outer tube and an inner tube slidably inserted into said outer tube from a lower side thereof.

17. A front fork assembly of a motorcycle, comprising:

a pair of inverted type front forks for supporting a front wheel of a motorcycle, each front fork comprising an outer tube and an inner tube slidably inserted into said outer tube from a lower side thereof;

upper and under brackets mounted on said front forks for connecting said front forks to a body of the motorcycle;

an axle bracket secured to a lower end of each of said front forks;

a caliper bracket secured to said axle bracket;

a caliper mounted to said caliper bracket;

a brake hose downwardly extending alone one front fork in front thereof, said brake hose having a lower end portion connected to said caliper;

a front fender secured to a lower end of said under bracket; and engaging means disposed on said outer tube below a lower end of said upper bracket for preventing said outer tube from slipping off upwardly;

said engaging means being disposed in spaced relation from the lower end of said upper bracket by a distance equal to or smaller than a displacement of the front wheel defined by a distance between an outer periphery of the front wheel and a lower surface of said front fender against which the outer periphery of the front wheel abuts when said front forks retract, said outer tube having an upper end portion composed of a large diametered portion and a small diametered portion to which said upper bracket is secured, and said engaging means being disposed at a front end of said large diametered portion and defined by a staged portion formed by a difference in diameters between said large and small diametered portions of said outer tube.

18. A front fork assembly according to claim 17, wherein said engaging means has a tapered portion formed between said large and small diametered portions of said outer tube.

19. A front fork assembly of a motorcycle, comprising:

a pair of inverted type front forks for supporting a front wheel of a motorcycle, each front fork comprising an outer tube and an inner tube slidably inserted into said outer tube from a lower side thereof;

upper and under brackets mounted on said front forks for connecting said front forks to a body of the motorcycle;

an axle bracket secured at a lower end of each of said front forks;

a caliper bracket secured to said axle bracket;

a caliper mounted to said caliper bracket;

a brake hose downwardly extending along one front fork in front thereof, said front fork and said brake hose having a lower end portion connected to said caliper;

a protector disposed in front of said front fork for protecting said brake hose, said protector having a lower end supported by said axle bracket;

a guide means mounted to said outer tube for slidably supporting an upper end of said protector; and means mounted to said outer tube for preventing said guide means from rotating about said outer tube, said means for preventing the guide means from rotating comprising a cap member mounted to said outer tube and a projection integrally formed on an outer periphery of said cap member and projecting towards said guide means.

20. A front fork assembly according to claim 19, wherein said guide means comprises a cylindrical portion mounted on said cap member and a frame portion surrounding said protector and supporting said protector for vertical sliding movement, said frame portion being provided with opposing base end portions between which said projection is firmly engaged in a manner that a central portion of said cap member, said projection, and a center of said projector supported by said frame portion are substantially aligned with each other.

21. A front fork assembly according to claim 19, wherein said projection has substantially a rectangular cross section.

* * * * *